April 19, 1955     N. F. HOSFORD     2,706,407

AIRSPEED INDICATOR

Filed March 28, 1949                                 2 Sheets—Sheet 1

INVENTOR.
NORMAN F. HOSFORD
BY
-ATTORNEY-

April 19, 1955     N. F. HOSFORD     2,706,407
AIRSPEED INDICATOR

Filed March 28, 1949     2 Sheets-Sheet 2

*INVENTOR.*
NORMAN F. HOSFORD
BY
*- ATTORNEY -*

United States Patent Office 2,706,407
Patented Apr. 19, 1955

2,706,407

AIRSPEED INDICATOR

Norman F. Hosford, Towaco, N. J., assignor to Bendix Aviation Corporation, Teterboro, N. J., a corporation of Delaware Application March 28, 1949, Serial No. 83,944

14 Claims. (Cl. 73—182)

The present invention relates to airspeed indicators, and more particularly to an indicator for airspeeds approaching the speed of sound.

An object of my present invention is to provide a novel and simple dial and pointer arrangement for an airspeed indicator to show airspeed and the safe limits of airspeed of a craft carrying the indicator.

A further object of this invention is to provide an airspeed indicator by which the Mach number of the varying ambient conditions is read with respect to a pointer movable in response to the airspeed of the craft.

Still another object of my invention is to provide an airspeed indicator of the general character indicated by which airspeed is shown at the lower limits of airspeed and by which the Mach number is shown at the higher airspeeds approaching the speed of sound.

Still another object of the present invention is to provide an airspeed indicator of the character described into which the Mach number of the aircraft on which the instrument is mounted may be set with respect to a movable Mach number dial, the pointer of the instrument moving with respect to a fixed airspeed dial and the movable Mach number dial and its preset Mach value, indicating the approach of the dangerous airspeed limit for the particular craft.

A further object of the invention is to provide an airspeed indicator which will simultaneously show the airspeed of the craft and the Mach number of the ambient pressure or density condition.

Still a further object of this invention is to provide an airspeed indicator of the character described in which the altitude of the craft may be shown in conjunction with the airspeed of the craft and the safe limit of airspeed as determined by the Mach number.

Yet another object of this invention is to provide an airspeed indicator of the character described which shall consist of few and simple parts, relatively inexpensive to manufacture, which shall be automatic and positive in its operation, have a large variety of application and yet be practical and efficient to a high degree in use.

Other objects of my invention will in part be obvious and in part hereinafter pointed out.

In the accompanying drawings forming a part of this specification in which several possible illustrative embodiments of the invention are shown, and wherein similar reference characters designate corresponding parts throughout the several views.

Fig. 4 is a schematic diagram of the operating parts of an airspeed indicator having a dial arrangement as shown in Figs. 1 and 2, while

Figure 1:
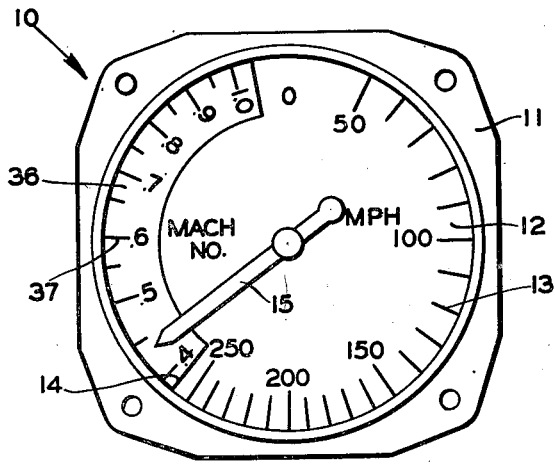
Fig. 1 is a front elevational view of the dials of a novel airspeed indicator.
Figure 4:
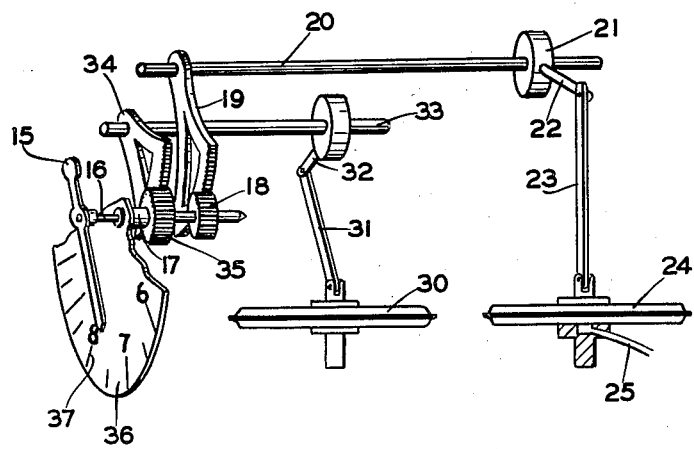

Referring now in detail to Figs. 1 and 4, the numeral 10 designates an airspeed indicator having the usual case enclosure (not shown) with a mounting flange 11. The instrument 10 is provided with a stationary dial face 12 having thereon the airspeed designations 13. It will be noted that the airspeed designations of the dial 12 are from 50 to 260 miles per hour. The dial 12 is formed with an arcuate slot or aperture 14, said aperture beginning at a point approximating the 260 M. P. H. designation of the dial 12. The dial 12 is provided with a pointer 15 having its axis of rotation concentric with said dial and with the aperture 14 therein.

The pointer 15 is fixed to a pointer shaft 16 passing through said dial and through a sleeve 17. The end of the shaft 16 is provided with a pinion 18 meshing with a gear sector 19 fixed to a horizontal shaft 20. Fixed to the rear end of the shaft 20 is a collar 21 having integral therewith a radially extending pin 22. The free end of the pin 22 is pivoted to one end of a link 23, the other end of the link being pivoted to a differential pressure responsive member 24, the interior of which is connected to a Pitot pressure source by a line 25 while the exterior thereof is subjected to ambient pressure within the instrument case.

It will be apparent that the expansion and contraction of the member 24 due to the variations in the dynamic and static pressures will rotate the shaft 20 through the linkage 23 to rotate the pointer shaft 16. The movement of the pointer 15 and its reading with respect to the fixed dial 12 will show the airspeed of the aircraft on which such an instrument is mounted.

Means is now provided to indicate the airspeed of a craft in terms of Mach number.

To this end, an aneroid 30 subjected to ambient pressure is fixed within the casing of the instrument. A link 31 is pivoted at one end to the aneroid and at the other end to a radially extending pin 32 integral with a shaft 33. The other end of the shaft 33 is provided with a gear sector 34, the teeth thereof meshing with a pinion 35 fixed to the sleeve 17. Fixed to the outer end of the sleeve 17 is an under dial 36 concentric with dial 12 and bearing the Mach number designations 37. The Mach number dial 36 is underneath the airspeed dial 12, the indications thereof being visible through the aperture 14.

The expansion and contraction of the aneroid 30 due to variations in altitude of the aircraft on which the instrument is mounted, will rock the gear sector 34 to rotate the Mach number dial 36. The Mach number dial will thus be positioned in accordance with the air density at a particular altitude of the craft, the Mach number designations appearing beyond the 260 M. P. H. designation of the fixed dial 12. Thus when the speed of the craft is above the 260 M. P. H. mark the pointer 15 will be moved over the Mach number dial 36 to provide a reading of Mach number in place of the M. P. H. reading. The reading of the pointer with respect to the dial 36 will indicate to the pilot of the aircraft the Mach number of the speed at which he is traveling. Knowing the Mach number of the particular craft which he is piloting the movement of the pointer 15 with respect to the Mach number indications 37 of the dial 36 will indicate to the pilot the approach of an airspeed which is dangerous to himself and his craft.

Figure 2:
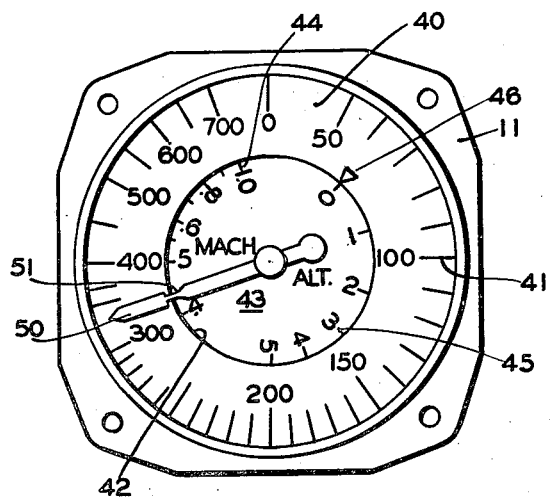
Fig. 2 is a front elevational view of a second dial arrangement for an airspeed indicator.

In Fig. 2 of the drawings, I have shown an alternate form of the dial arrangement for an instrument operable by the mechanism as shown in Fig. 4. In Fig. 2, the stationary dial 40 bears the miles per hour designations 41, the designations going the full 360 degrees of the dial. The dial 40 is provided with a central aperture 42. An inner dial 43 within the opening 42 is fixed to the sleeve 17 as was the case of the dial 36. The dial 43 is provided with Mach number designations 44 similar to the dial 36. The dial 43 is further provided with altitude markings 45 which are read with respect to an index mark 46 on the stationary dial 40.

The operation of the instrument as illustrated in Fig. 2 is the same as that of the instrument as shown in Fig. 1. The pointer 50 of the instrument in Fig. 2 is provided with a cut out section 51 to form a second pointer to be read with respect to the Mach number indications 44 of the inner dial. Thus with the instrument as shown in Fig. 2, the airspeed of the craft on which the instrument is mounted is shown together with the Mach number and the altitude of the craft.

Figure 3:
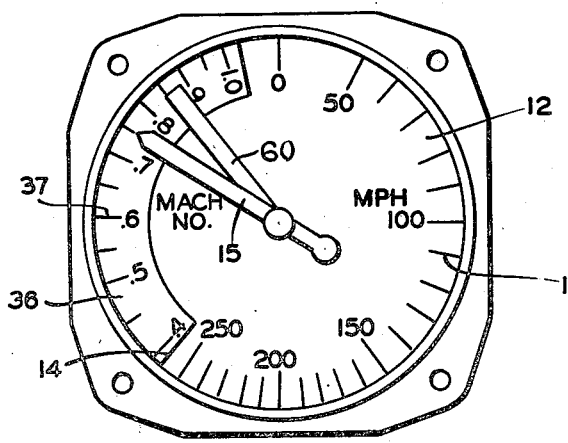
Fig. 3 is a front elevational view of another dial arrangement for an airspeed indicator.
Figure 5:
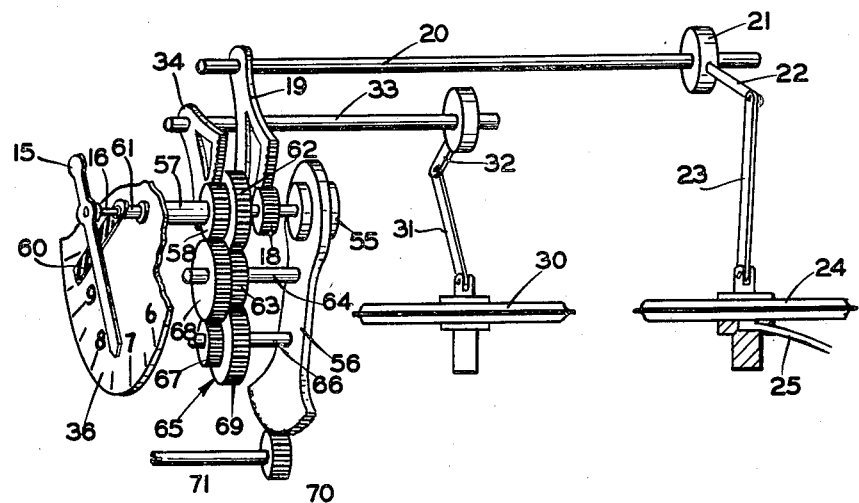
Fig. 5 is a schematic diagram of the operating parts of an airspeed indicator having a dial arrangement as shown in Fig. 3.

In Figs. 3 and 5 I have shown another embodiment of my invention in which the Mach number of the craft on which the instrument is mounted may be preset, the closing of the angle between the airspeed pointer and the preset Mach number pointer indicating to the pilot the approach of a dangerous flying speed.

The instrument shown in Figs. 3 and 5 is provided with the stationary dial 12 and the under dial 36 bearing the Mach number designations 37. The pointer 15 of the instrument is rotated with respect to the dials 12 and 36 by the differential pressure responsive member 24 and the interconnecting mechanism to the pointer shaft 16. It will be noted that the end of the pointer shaft 16 is journaled in a bushing 55 within the case of the instrument, the bushing 55 forming a pivot for an elongated gear sector 56. The under dial 36 of the instrument is fixed to one end of a sleeve 57, the end of the sleeve having integral therewith a pinion 58 meshing with the gear sector 34 which is oscillated by the expansion and contraction of the aneroid 30.

To indicate the Mach number of the craft on which the instrument may be mounted, a pointer 60 of different configuration and color than the pointer 15 is provided for the dial 36. The pointer 60 is fixed at one end to sleeve 61, the other end having integral therewith a pinion 62. The pointer shaft 16 passes through the sleeve 61, while the sleeve 61 passes through the under dial shaft 57. The pinion 62 meshes with a pinion 63 rotatable on a shaft 64 journaled at one end into the gear sector 56. The pinion 63 in turn meshes with the teeth 69 of a double pinion 65 rotatable on a shaft 66 and journaled in the gear sector 56. The teeth 67 of the double pinion in turn mesh with the pinion 68 rotatable on the shaft 64; the pinion 68 also meshing with the pinion 58. A pinion 70 meshes with the teeth of the gear sector 56, the shaft 71 of the pinion 70 extending forwardly and passing out through the front of the instrument case to provide a means whereby the pointer 60 may be preset with respect to the dial 36.

The airspeed pointer 15 will be operated in the same manner as hereinbefore described by the expansion and contraction of the differential pressure member 24. The under dial 36 will be operated by the expansion and contraction of the aneroid 30 through the gear sector 34 and the pinion 58. The rotation of the pinion 58 will in turn rotate the pinions 68, 65, 63 and 62 to rotate the pointer 60 with the under dial 36 so that the pointer and dial will be rotated together.

Rotation of the shaft 71 will displace the gear sector 56 about its pivot 55. The angular displacement of the gear sector will carry the shafts 64 and 66 therewith, to rotate the pinion 62 with respect to the pinion 58. The rotation of the pinion 62 will move the pointer 60 with respect to the under dial 36 to provide a Mach number indication of the craft on which the instrument is mounted.

The rotation of the pointer 15 by the differential member 24 will provide a reading in M. P. H. with respect to the dial 12 up to approximately 260 M. P. H. Speeds beyond this point will be indicated in accordance with the Mach number read with respect to the under dial 36. The closing angle of the airspeed pointer 15 with respect to the Mach number pointer 60 will indicate to the pilot the approach of a dangerous airspeed.

Pointer 15 and Mach number dial 36 in Figs. 1 and 4, pointers 50, 51 and dial 43 in Fig. 2 and pointers 15 and 60 and dial 36 in Figs. 3 and 5 move logarithmically. Also, airspeed designations 13 on dial 12 and Mach number designations 37 on dial 36 in Figs. 1, 3, 4 and 5 and airspeed designations 41 on dial 40 and Mach number designations 44 and altitude markings 45 on dial 43 in Fig. 2 are laid out logarithmically.

It will thus be apparent that there is provided a novel and compact airspeed indicator in which the several objects of this invention are achieved and which is well adapted to meet the conditions of practical use.

As various embodiments may be made of the above invention, and as various changes may be made in the embodiments set forth above, it will be understood that all matter herein described or shown in the accompanying drawings is to be interpreted as illustrative and not in a limiting sense.

Having thus described my invention, I claim as new and desire to secure by Letters Patent:

1. An airspeed indicator comprising a fixed dial with airspeed designations thereon, a movable dial with Mach number designations thereon concentric with said first dial, a pressure responsive member for moving said second dial in accordance with ambient pressure, a pointer cooperating with said dials, and a pressure responsive member for rotating said pointer with respect to both said dials in accordance with the airspeed.

2. An airspeed indicator comprising a fixed dial with airspeed designations thereon, a movable dial concentric with said first dial with Mach number designations and altitude designations thereon, a pressure responsive member for moving said second dial in accordance with ambient pressure, a pointer cooperating with said dials, and a pressure responsive member for moving said pointer with respect to both of said dials in accordance with airspeed, there being a reference point on said stationary dial cooperating with the altitude designations on said movable dial to indicate altitude.

3. An airspeed indicator comprising a fixed dial with airspeed designations thereon, a rotatable dial concentric with said fixed dial and having Mach number designations thereon, means responsive to ambient pressure and connected for moving said rotatable dial relative to said fixed dial, a pointer cooperating with said dials, and means responsive to airspeed and connected for moving said pointer relative to said dials.

4. In an airspeed indicator for use aboard aircraft, a fixed dial with airspeed designations thereon, a rotatable dial concentric with said first dial and having Mach number designations thereon, means responsive to ambient pressure and connected for moving said second dial relative to said first dial, a pointer cooperating with said dials, means responsive to airspeed and connected for moving said pointer relative to said dials, a second pointer rotatable with said second dial for indicating the maximum permissible safe airspeed for the craft, and means operably connected to said second pointer for moving it relative to said second dial to set in a selected Mach number.

5. An airspeed indicator comprising a fixed dial having airspeed designations thereon and formed with an aperture therein, a concentric movable dial having Mach number designations thereon visible in the aperture of said first dial, means responsive to ambient pressure and connected for moving said second dial relative to said first dial, a pointer cooperating with said dials, and means responsive to airspeed and connected for moving said pointer relative to said dials.

6. An airspeed indicator comprising a fixed dial having airspeed designations thereon and formed with an aperture therein, a concentric movable dial having Mach number designations thereon visible in the aperture of said first dial, means responsive to ambient pressure and connected for moving said second dial relative to said first dial, a pointer cooperating with both said dials, means responsive to airspeed and connected for moving said pointer relative to both said dials, a second pointer rotatable with said movable dial, and means operably connected to said second pointer for moving the latter relative to said second dial for setting a desired Mach number into the indicator.

7. An airspeed indicator comprising a fixed dial having airspeed designations thereon and formed with an aperture therein, a concentric movable dial having Mach number designations and altitude designations thereon visible in the aperture of said first dial, there being a reference point on said first dial for cooperation with the altitude designations of the movable dial, means responsive to ambient pressure and connected for moving said second dial relative to said first dial, a pointer cooperating with both said dials, and means responsive to airspeed for moving said pointer relative to both said dials.

8. An airspeed indicator comprising a stationary dial having airspeed designations thereon and formed with an arcuate aperture, a dial concentric with and behind said first dial having Mach number designations thereon visible through the aperture of the first dial, means responsive to ambient pressure and connected for moving said second dial, a pointer cooperating with both said dials, and means responsive to airspeed and connected for moving said pointer relative to both said dials.

9. An airspeed indicator comprising a stationary dial having airspeed designations thereon and formed with an arcuate aperture, a dial concentric with and behind said first dial having Mach number designations thereon visible through the aperture of the first dial, means responsive to ambient pressure and connected for moving said second dial, a pointer cooperating with both said dials, means responsive to airspeed and connected for moving said pointer relative to both said dials, a second pointer rotatable with said second dial, and means operably connected to said second pointer for moving the latter relative to said second dial for setting in a desired Mach number.

10. In an airspeed indicator, a stationary airspeed dial, a second dial concentric with said airspeed dial and having Mach number designations thereon, means responsive to air pressure and connected for moving said second dial relative to said first dial, a pointer cooperating with said airspeed dial, means responsive to airspeed and connected for moving said pointer relative to said first dial to indicate airspeed, and a second pointer integral with said first pointer and cooperating with said second dial for indicating airspeed in terms of Mach number.

11. A combined air speed and corresponding Mach number indicating instrument for aircraft, comprising a stationary dial and a juxtaposed relatively movable dial, said stationary dial being calibrated logarithmically to indicate air speeds, said movable dial being correspondingly calibrated logarithmically to indicate Mach numbers corresponding to the air speed indications up to and at least including unity, a combined air speed and Mach number indicating pointer movable over said dials to selectively register with corresponding adjacent air speed and Mach number indicia on said dials, means responsive to air speed and connected for moving said pointer logarithmically relative to said stationary dial air speed indicia and to said movable dial Mach numbers to indicate air speeds and corresponding Mach numbers, and differential pressure responsive means responsive to ambient pressure for moving the movable dial relative to the stationary dial for adjusting the Mach number indicia relation relative to the air speed indicia for variations in the ambient pressure.

12. A Mach number indicator for aircraft comprising, a rotatable first dial including indicia distributed therearound to indicate Mach numbers over a normal range for high speed aircraft, an adjacent circular dial in concentric relation to said first dial and having indicia thereon scaled off in terms of indicated air speed and having unit segments which are of logarithmic magnitude with respect to indicated air speed, a pointer rotatably mounted centrally of said dials and adapted to sweep over the indicia thereof upon rotation of said pointer, means including a pressure responsive element connected by a tube with a Pitot pressure head to rotate said pointer an amount proportional to the logarithmic function of the impact pressure in the free air stream and to rotate said pointer in a direction to indicate increasing Mach number on said first dial with increases in the air speed, means including a static pressure responsive element to rotate said first dial an amount proportional to the logarithmic function of the static pressure of the free air, and to rotate said first dial in a direction to indicate with respect to said pointer increasing Mach number with increases in altitude, whereby the intersection of the pointer and the indicia of said first dial shows the instant Mach number of the aircraft by providing an arithmetical subtraction of the logarithm of the static pressure from the logarithm of the impact pressure and the intersection of the pointer and the indicia of said second dial shows the instant indicated air speed of the aircraft.

13. A Mach number indicator for aircraft comprising, a rotatable first dial including indicia distributed therearound to indicate Mach numbers over the normal range for high speed aircraft, an adjacent circular second dial in concentric relation to said first dial and having indicia thereon scaled off in terms of indicated air speed and having unit segments which are of logarithmic magnitude with respect to indicated air speed, a pointer rotatably mounted centrally of said dials and adapted to sweep over the indicia thereof upon rotation of said pointer, a bellows exposed on the outside thereof to static air pressure and having its interior connected by a tube with a Pitot pressure head in the free air stream, one side wall of said bellows being movable and being connected through a linkage to said pointer for moving said pointer in proportion to the logarithmic function of the air impact pressure and for moving said pointer in a direction to indicate increasing Mach number on said first dial with increases in the air speed, means including a static pressure responsive element to rotate said first dial in proportion to the logarithmic function of static air pressure and to rotate said first dial in a direction to indicate with respect to said pointer increasing Mach number with increases in altitude, whereby the intersection of said pointer and the indicia of the first dial provides an indication of instant Mach number and the intersection of said pointer and the indicia of the second dial provides an indication of the instant indicated air speed.

14. An airspeed indicator comprising a fixed dial, a rotatable dial concentric with said fixed dial, one of said dials having a Mach number scale and the other of said dials having an airspeed scale, a rotatable pointer cooperating with said dials, means responsive to ambient pressure, means responsive to airspeed, means connecting one of said responsive means to said rotatable dial for actuating said dial, means connecting the other of said responsive means to said rotatable pointer for actuating said pointer, a second pointer normally rotatable with said rotatable dial but capable of adjustment relative thereto, and means operably connected to said second pointer for adjusting it relative to said rotatable dial.

References Cited in the file of this patent

UNITED STATES PATENTS

| 1,413,514 | Berry | Apr. 18, 1922 |
| 2,424,511 | Stanley et al. | July 22, 1947 |

FOREIGN PATENTS

| 274,082 | Great Britain | July 26, 1928 |
| 311,326 | Italy | Sept. 27, 1933 |
| 823,282 | France | Oct. 11, 1937 |
| 575,008 | Great Britain | Jan. 30, 1946 |